United States Patent [19]

Iino et al.

[11] Patent Number: 4,949,596

[45] Date of Patent: Aug. 21, 1990

[54] METHOD OF CONTROLLING CONTINUOUSLY VARIABLE AUTOMOTIVE TRANSMISSION

[75] Inventors: Takashi Iino; Kazuya Maki, both of Saitama, Japan

[73] Assignee: Honda Giken Kogyo Kabushiki Kaisha, Tokyo, Japan

[21] Appl. No.: 73,737

[22] Filed: Jul. 15, 1987

[30] Foreign Application Priority Data

Jul. 15, 1986 [JP] Japan ................ 61-166325

[51] Int. Cl.⁵ .......................... B60K 17/356
[52] U.S. Cl. ........................ 74/866; 74/868
[58] Field of Search ............ 74/864, 866, 867, 868, 74/869; 180/242

[56] References Cited

U.S. PATENT DOCUMENTS

| | | | |
|---|---|---|---|
| 3,054,263 | 9/1962 | Budzich | 60/490 |
| 3,362,262 | 1/1968 | Breuder | 74/868 |
| 3,442,153 | 5/1969 | Ross | 74/687 |
| 3,455,184 | 7/1969 | Frandsen | 74/687 |
| 3,733,931 | 5/1973 | Nyman et al. | 74/868 |
| 3,910,043 | 10/1975 | Clerk | 60/413 |
| 3,941,016 | 3/1976 | Will | 74/868 |
| 3,999,387 | 12/1976 | Knopf | 60/444 |
| 4,087,969 | 5/1978 | Takahashi | 60/464 |
| 4,102,131 | 7/1978 | Reynolds | 60/431 |
| 4,111,074 | 9/1978 | Northup | 74/867 |
| 4,122,732 | 10/1978 | Chana | 74/863 |
| 4,158,290 | 6/1979 | Cornell | 60/445 |
| 4,170,153 | 10/1979 | Mizuno et al. | 74/868 |
| 4,232,572 | 11/1980 | Ross et al. | 74/867 |
| 4,246,806 | 1/1981 | Reynolds | 74/687 |
| 4,253,347 | 3/1981 | Mizuno et al. | 74/866 |
| 4,261,229 | 4/1981 | Mizuno et al. | 74/866 |
| 4,368,653 | 1/1983 | Mizuno | 74/868 |
| 4,509,125 | 4/1985 | Fattic et al. | 74/866 |
| 4,612,828 | 9/1986 | Ide | 74/866 |
| 4,649,485 | 3/1987 | Osanai et al. | 74/866 |
| 4,653,006 | 3/1987 | Osanai | 364/424.1 |
| 4,662,248 | 5/1987 | Greenwood | 74/868 |
| 4,665,773 | 5/1987 | Hiramatsu et al. | 74/867 |
| 4,682,519 | 7/1987 | Okada | 74/868 |
| 4,693,144 | 9/1987 | Eggert | 74/868 |
| 4,699,604 | 10/1987 | Yokoyama | 474/18 |
| 4,702,128 | 10/1987 | Oshiage | 74/866 |
| 4,715,258 | 12/1987 | Shigematsu et al. | 74/866 |
| 4,716,791 | 1/1988 | Ohzono et al. | 74/867 |
| 4,727,771 | 3/1988 | Niwa et al. | 74/866 |
| 4,729,103 | 3/1988 | Oshiage et al. | 74/866 |
| 4,729,263 | 3/1988 | Hopff | 74/867 |
| 4,730,518 | 3/1988 | Miyawaki | 74/866 |
| 4,730,523 | 3/1988 | Takahashi | 74/868 |
| 4,747,807 | 5/1988 | Nakamura | 474/28 |
| 4,811,225 | 3/1989 | Petzold | 364/424.1 |

FOREIGN PATENT DOCUMENTS

| | | | |
|---|---|---|---|
| 0101151 | 2/1984 | European Pat. Off. | |
| 0127082 | 12/1984 | European Pat. Off. | 74/866 |
| 3401381 | 7/1985 | Fed. Rep. of Germany . | |
| 55-14312 | 1/1980 | Japan . | |
| 473997 | 12/1967 | Switzerland . | |

Primary Examiner—Leslie A. Braun
Assistant Examiner—Harold F. Macris
Attorney, Agent, or Firm—Lyon & Lyon

[57] ABSTRACT

The transmission ratio of an automotive continuously variable transmission is controlled on the basis of the difference between a target rotational speed of the engine which is preset according to an indication of the driver's intention of acceleration or deceleration and a detected rotational speed of the engine. The gain of the rate of change of the transmission ratio is reduced as the detected rotational speed of the engine becomes higher, and the gain of the rate of change of the transmission ratio is increased as the detected rotational speed of the engine becomes lower. Alternatively, the gain of the rate of change of the transmission ratio is of a relatively small value when the detected rotational speed of the engine is equal to or higher than a preset speed, and the gain of the rate of change of the transmission ratio is of a relatively large value when the detected rotational speed of the engine is lower than said preset speed.

13 Claims, 8 Drawing Sheets

METHOD OF CONTROLLING CONTINUOUSLY VARIABLE AUTOMOTIVE TRANSMISSION

BACKGROUND OF THE INVENTION

The present invention relates to a method of controlling a continuously variable automotive transmission by controlling the transmission ratio based on the difference between a target rotational engine speed which is preset according to an indication of the driver's intention of acceleration or deceleration and a detected rotational engine speed.

There is known a method of controlling continuously variable automotive transmission as disclosed by Japanese Laid-Open Patent Publication No. 55(1980)14312.

In the above control method, the rate of change $di/dt$ of the transmission ratio i per unit time can be given by the equation (1):

$$\frac{di}{dt} = K \cdot (Neo - Ne) \quad (1)$$

where Neo is the target rotational engine speed and the detected rotational engine speed. The detected rotational engine speed Ne is expressed by the following equation (2):

$$Ne = C \cdot V \cdot i \quad (2)$$

where V is the speed of travel of the automobile or the output rotational ending speed, and C is a constant.
Therefore, the rate of change $dNe/dt$ of the detected rotational engine speed Ne is as follows:

$$\frac{dNe}{dt} = C \cdot V \cdot \frac{di}{dt} + C \cdot i \cdot \frac{dV}{dt} \quad (3)$$

Since the automobile speed V does not immediately vary greatly even if the speed is changed while the automobile is running, $dV/dt \approx 0$, and hence the equation (3) approximates to the following equation (4):

$$\frac{dNe}{dt} = C \cdot V \cdot \frac{di}{dt} \quad (4)$$

From the equations (2) and (4), we get $$\frac{dNe}{dt} = \frac{Ne}{i} \cdot \frac{di}{dt} \quad (5)$$

From the equations (1) and (5), the following equation results:

$$\frac{dNe}{dt} = \frac{K \cdot Ne \cdot (Neo - Ne)}{i} \quad (6)$$

Heretofore, a gain K is constant, and it can be understood from the equation (6) that $dNe/dt$ is proportional to Ne, (Neo−Ne), 1/i.

It is now assumed that the gain K in the equation (6) is established such that $dNe/dt$ will be optimum when the detected engine speed Ne is low. Under this assumption, when the difference (Neo−Ne) does not vary greatly, $dNe/dt$ may become excessively large at the time the detected engine speed Ne is increased. When this happens, the engine speed Ne may abruptly increase or decrease, and the difference (Neo−Ne) may repeatedly alternate between positive and negative values, making transmission operation unstable.

Conversely, it is assumed that the gain K is established such that $dNe/dt$ will be optimum when the detected engine speed Ne is high. Under this assumption, when the difference (Neo−Ne) and the transmission ratio i do not vary greatly, $dNe/dt$ may become excessively small at the time the detected engine speed Ne is reduced, and the response of the transmission may become slow.

SUMMARY OF THE INVENTION

In view of the aforesaid drawbacks of the conventional method of controlling a continuously variable transmission, it is an object of present invention to provide a method of controlling a continuously variable transmission with good stability and response.

According to the present invention, there is provided a method of controlling a continuously variable transmission in an automobile having an engine by controlling the transmission ratio thereof based on the difference between a target rotational speed of the engine which is preset according to an indication of the driver's intention of acceleration or deceleration and a detected rotational speed of the engine, the method comprising the step of reducing the gain of the rate of change of the transmission ratio as the detected rotational speed of the engine becomes higher.

With the above method, since the rate of change of the detected engine speed does not vary in proportion to the detected engine speed, the rate of change of the detected engine speed remains the same irrespective of whether the engine speed is high or low. Both stability and response are thus accomplished in the control of the transmission.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Like or corresponding reference numerals and letters denote like or corresponding parts throughout several views.

Figure 1:
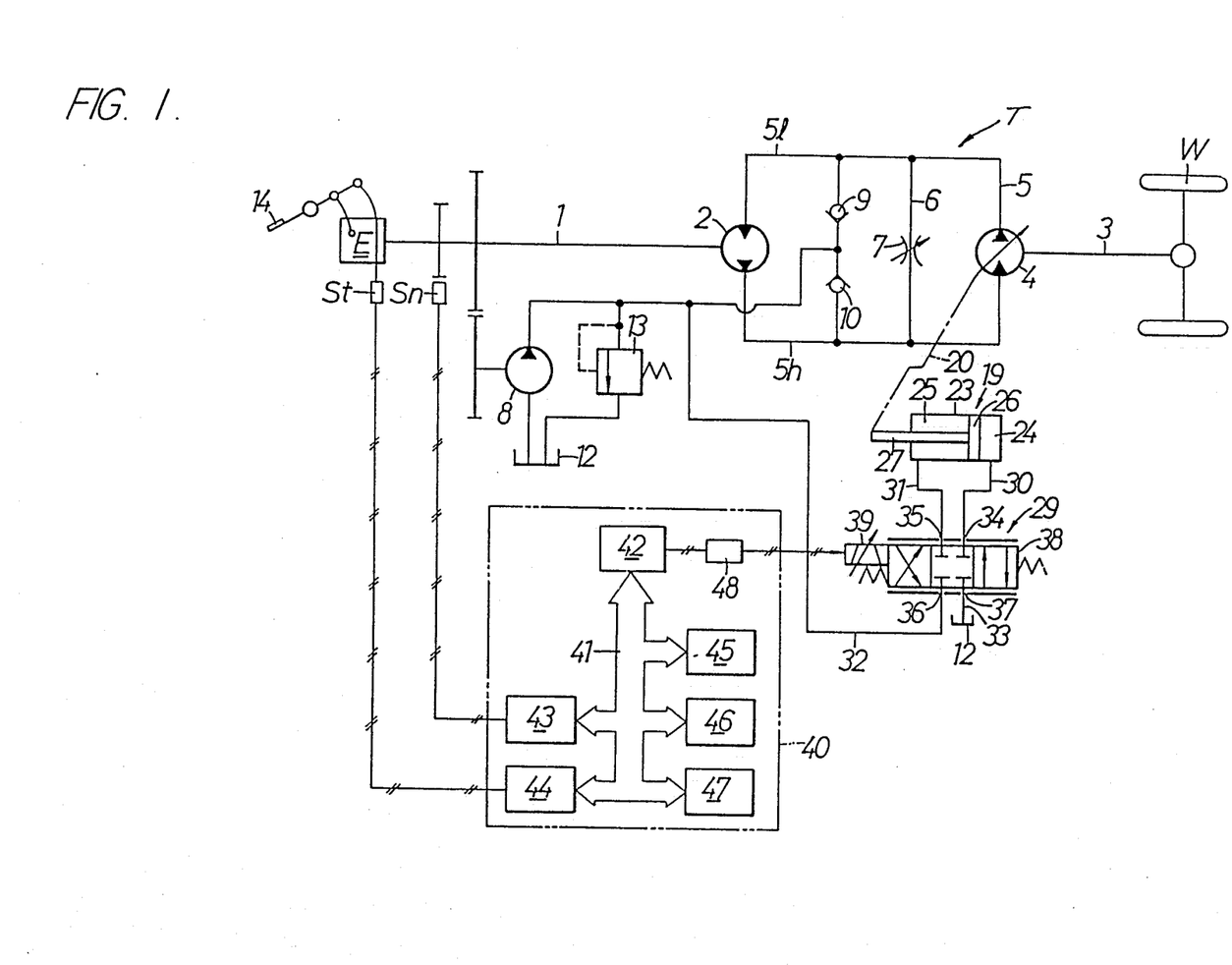
FIG. 1 is a circuit diagram, partly in block form, of an arrangement for carrying out a method of controlling a continuously variable transmission according to a first embodiment of the present invention.

FIG. 1 shows a first embodiment of the present invention. A hydraulically operated, continuously variable transmission T for use in an automobile includes a hydraulic pump 2 of the fixed displacement type having an input shaft 1 drivable by an automotive engine E, and a hydraulic motor 4 of the variable displacement type having a drive shaft 3 disposed coaxially with the hydraulic pump 2 for driving wheels W. The hydraulic pump 2 and the hydraulic motor 4 are interconnected by a closed hydraulic circuit 5. Specifically, the closed hydraulic circuit 5 includes a higher-pressure oil passage 5h interconnecting the outlet port of the hydraulic pump 2 and the inlet port of the hydraulic motor 4, and a lower-pressure oil passage 5l interconnecting the outlet port of the hydraulic motor 4 and the inlet port of the hydraulic pump 2.

A bypass oil passage 6 is coupled between the outlet and inlet ports of the hydraulic pump 2, i.e., the higher- and lower-pressure oil passages 5h, 5l, in bypassing relation to the hydraulic motor 4. The bypass oil passage 6 has a clutch valve 7 serving as a clutch.

A supply pump 8 which can be driven by the input shaft 1 through a gear train has an outlet port connected via check valves 9, 10 to the lower- and higher-pressure oil passages 5l, 5h for supplying working oil from an oil tank 12 to the closed hydraulic circuit 5 in order to compensate for a shortage of oil in the circuit 5. A relief valve 13 is connected between the outlet port of the supply pump 8 and the oil tank 12 for releasing an excessive oil pressure discharged by the supply pump 8.

The opening of the clutch valve 7 is controlled by a control device (not shown). Power transmission between the input shaft 1 and the output shaft 3 can be controlled by the amount of opening of the clutch valve 7.

The transmission ratio i of the continuously variable transmission T is controlled by continuously changing the displacement of the hydraulic motor 4 with respect to the fixed displacement of the hydraulic pump 2. If the displacement of the hydraulic motor 4 is increased, the transmission ratio i is also increased. If the displacement of the hydraulic motor 4 is reduced, the transmission ratio i is also reduced. Thus, the transmission ratio i between the rotational speed of the engine E and the rotational speed of the wheels W can continuously be varied.

Figure 2:
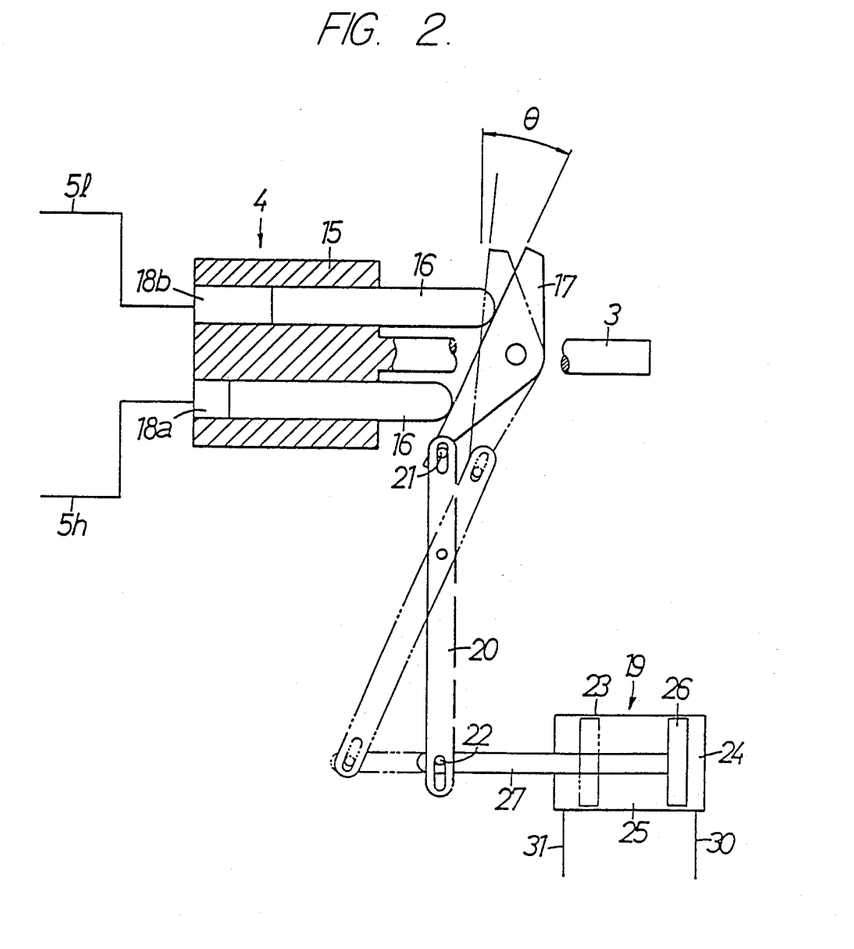
FIG. 2 a view showing how a hydraulic motor and a hydraulic cylinder are operatively coupled to each other.

As illustrated in FIG. 2, the hydraulic motor 4 comprises a variable-displacement axial piston motor, for example. The hydraulic motor 4 includes a cylinder block 15 coupled to the output shaft 3 and a plurality of pistons 16 slidably fitted in the cylinder block 15 and angularly spaced in an annular pattern around the rotational axis of the output shaft 3. A swash plate 17 for limiting the reciprocating stroke of the pistons 16 is held against the tip ends of the pistons 16, the swash plate 17 being inclined at a variable angle $\theta$. A cylinder chamber 18a defined in the cylinder block 15 and receiving one of the pistons 16 which is in an expanding stroke communicates with the higher-pressure oil passage 5h. A cylinder chamber 18b defined in the cylinder block 15 and receiving one of the pistons 16 which is in a contracting stroke communicates with the lower-pressure oil passage 5l.

The hydraulic motor 4 of the above structure is known in the art. Higher-pressure oil discharged from the hydraulic pump 2 is delivered via the higher-pressure oil passage 5h into the cylinder chamber 18a, and lower-pressure oil discharged from the cylinder chamber 18b is returned via the lower-pressure oil passage 5l back to the hydraulic pump 2. During this time, the cylinder block 15 and hence the output shaft 3 are rotated by reactive torque imposed by the swash plate 17 on the piston 16 in the expanding stroke.

The displacement of the hydraulic motor 4 is determined by the stroke of the pistons 16. Thus, the transmission ratio i of the transmission T can continuously be varied from a minimum level to a maximum level by changing the angle $\theta$ of the swash plate 17 from a maximum value (indicated by the solid lines) to a minimum value (indicated by the two-dot-and-dash lines). The transmission ratio i is given by the following equation:

$$\text{Transmission ratio } i = \frac{\text{Input rotational speed}}{\text{Ouput rotational speed}}$$
$$= \frac{\text{Motor displacement}}{\text{Pump displacement}}$$

One end of the swash plate 17 is coupled by a pin 21 to one end of a swingable link 20, the other end of which is joined to a hydraulic cylinder assembly 19 by a pin 22 extending parallel to the pin 21.

The cylinder assembly 19 comprises a cylinder 23, a piston 26 slidably fitted in the cylinder 23 and dividing the interior of the cylinder 23 into a head chamber 24 and a rod chamber 25, and a piston rod 27 integrally joined to the piston 26 and extending movably in a fluid-tight manner through the end of the cylinder 25 adjacent to the rod chamber 25.

The distal end of the piston rod 27 is coupled to the other end of the swingable link 20 by the pin 22. When the piston 26 is moved to the rightmost position, the angle of the swash plate 17 is maximized to maximize the displacement of the hydraulic motor 4 for thereby increasing the transmission ratio i to a maximum. Conversely, when the piston 26 is moved to the leftmost position, the swash plate angle is reduced to a minimum as indicated by the two-dot-and-dash lines, and so is the displacement of the hydraulic motor 4, minimizing the transmission ratio i.

Referring back to FIG. 1, a solenoid-operated directional control valve 29 is connected between an oil passage 30 coupled to the head chamber 24 of the hydraulic cylinder assembly 19 and a oil passage 31 coupled to the rod chamber 25 of the hydraulic cylinder assembly 19, and an oil supply passage 32 coupled to the supply pump 8 and an oil release passage 33 coupled to the oil tank 12.

The control valve 29 has ports 34, 35 communicating with the oil passages 30, 31, respectively, and ports 36, 37 communicating with the oil supply and release passages 32, 33, respectively. The control valve also has a spool 38 switchingly movable between a lefthand position in which the ports 35, 37 communicate with each other and the ports 36, 34 communicate with each other, a neutral position in which the ports 36, 35 and the ports 34, 37 are disconnected from each other, and a righthand position in which the ports 36, 35 communicate with each other and the ports 34, 37 communicate with each other. The spool 38 as it moves between the above three positions has an intermediate position in which the degree of restriction is continuously variable.

Figure 3:
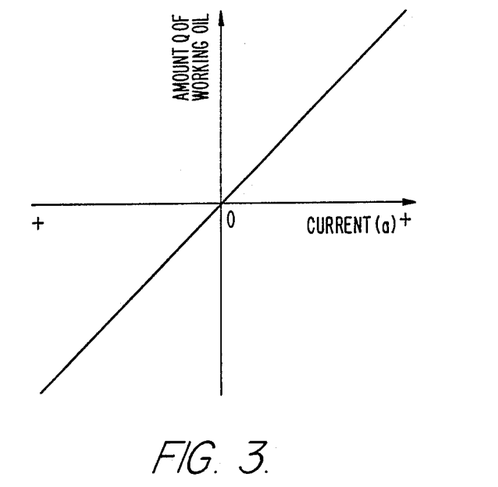
FIG. 3 is a graph showing the relationship between an input current supplied to a solenoid and the amount of working oil.

The spool 38 is moved according to a current a supplied to a solenoid 39. The amount of working oil supplied to and discharged from the hydraulic cylinder assembly 19 via the directional control valve 29 is varied as shown in FIG. 3 dependent on the position of the spool 38. More specifically, when the current a is increased in a positive direction, the spool 38 is moved toward the righthand position for proportionally increasing the amount Q of working oil supplied to the rod chamber 25 of the hydraulic cylinder assembly 19. When the current a is increased in a negative direction, the spool 38 is moved toward the lefthand position for proportionally increasing the amount Q of working oil supplied to the head chamber 24 of the hydraulic cylinder assembly 19. In FIG. 3, the amount Q of working oil supplied to the rod chamber 25, i.e., the amount Q of working oil discharged from the head chamber 24, is indicated on the positive side, whereas the amount Q of working oil discharged from the rod chamber 25, i.e., the amount Q of working oil supplied to the head chamber 24, is indicated on the negative side.

The relationship between operation of the control valve 29, the hydraulic cylinder assembly 19, and the hydraulic motor 4 and the transmission ratio i is given in the following table 1:

TABLE 1

| Item | Current a 0 | + | − |
|---|---|---|---|
| Control valve 29 | Neutral position | Moved toward righthand position | Moved toward lefthand position |
| Cylinder assembly 19 | Stopped | Moved to right | Moved to left |
| Hydraulic motor 4 | Fixed displacement | Larger capacity | Smaller capacity |
| Transmission ratio i | Fixed | Higher | Lower |

Figure 4:
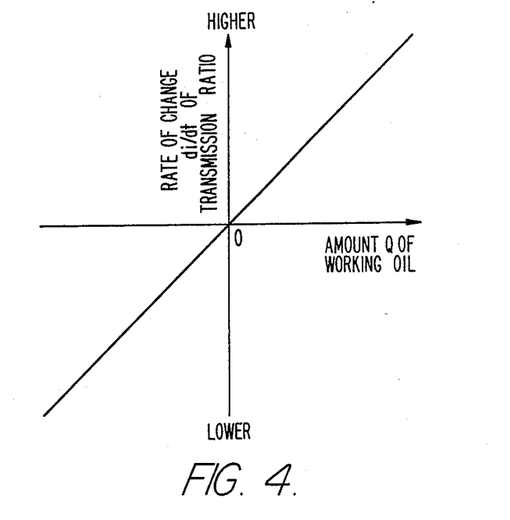
FIG. 4 is a graph illustrating the relationship between the amount of working oil and the rate of change of a transmission ratio.

The rate of change di/dt of the transmission ratio i based on changes in the amount Q of the working oil as shown in FIG. 3 is illustrated in FIG. 4.

Figure 5:
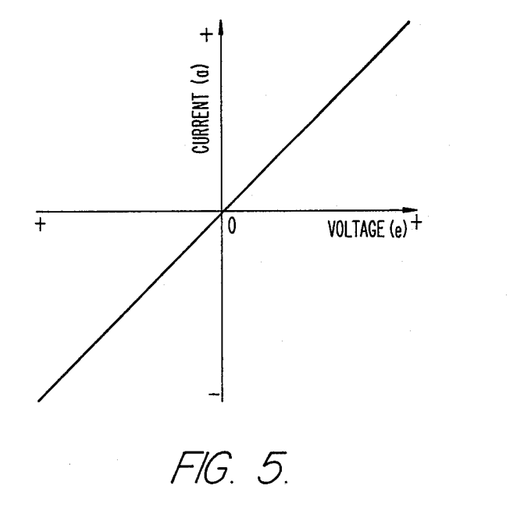
FIG. 5 is a graph showing the relationship between an input current supplied to and an output current flowing from an amplifier.

As shown in FIG. 1, the solenoid 39 of the control valve 29 is controlled by a control circuit 40 comprising a digital-to-analog converter 42, an interface 43, an analog-to-digital converter 44, a central processing unit 45, a random-access memory 46, and a read-only memory 47 which are interconnected to an address data bus 41. The interface 43 is supplied with a pulse signal from an engine rotation sensor Sn which detects the rotational speed o the engine E, the pulse signal being indicative of the detected engine rotational speed. The analog-to-digital converter 44 is supplied with an analog signal from a throttle opening sensor St which detects the amount of opening of the throttle valve dependent on the depression of an accelerator pedal 14 which serves as an indication of the driver's intention of acceleration or deceleration, the analog signal being representative of the amount of opening of the throttle valve. The control circuit 40 also has an amplifier 48 connected between the digital-to-analog converter 42 and the solenoid 39. The amplifier 48 produces the current a proportional to an input voltage e applied by the digital-to-analog converter 42 as shown in FIG. 5, the current a being supplied to the solenoid 39.

Figure 6:
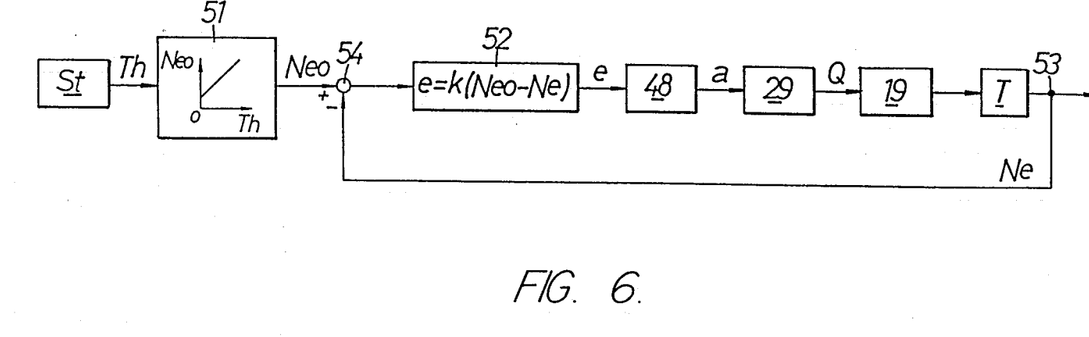
FIG. 6 is a block diagram of a control system.

FIG. 6 is a block diagram of a control system. The amount of opening Th of the throttle valve, which has been detected by the throttle opening sensor St, is applied to a block 51 in which a target engine speed Neo is selected from a map based on the applied amount of opening Th of the throttle valve. The difference (Neo−Ne) between the target engine speed Neo and a detected engine speed Ne is obtained at an adding point 54. The difference (Neo−Ne) is amplified to an output voltage e with a gain k by a next block 52. The output voltage e is employed to control the continuously variable transmission T through the amplifier 48, the control valve 29, and the cylinder assembly 19. The engine speed Ne dependent on the transmission ratio i determined by the transmission T is fed back from a feedback point 53 to the adding point 54.

Figure 7:
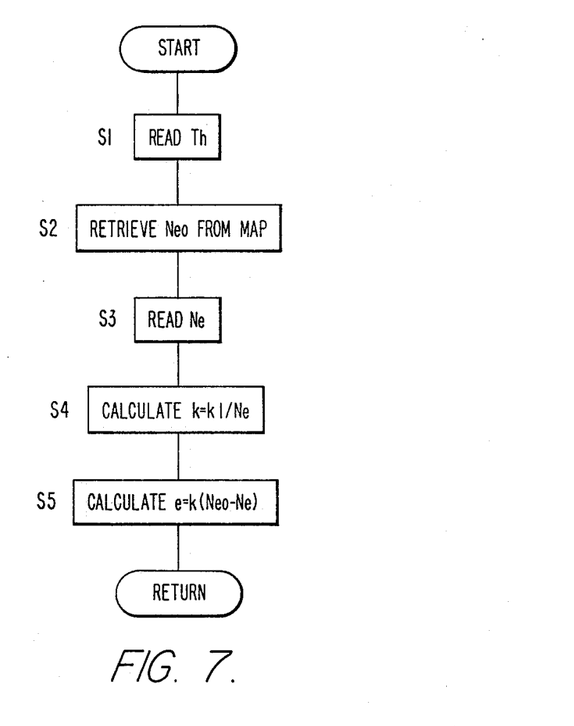
FIG. 7 is a flowchart of a control sequence.
Figure 8:
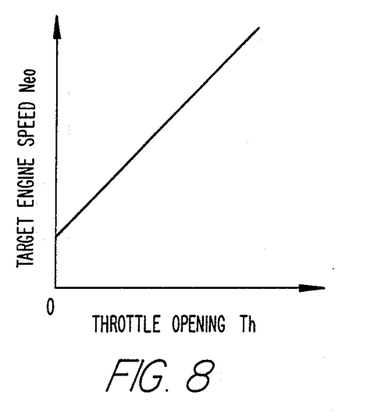
FIG. 8 is a graph showing target rotational engine speeds plotted against amounts of throttle valve opening.
Figure 9:
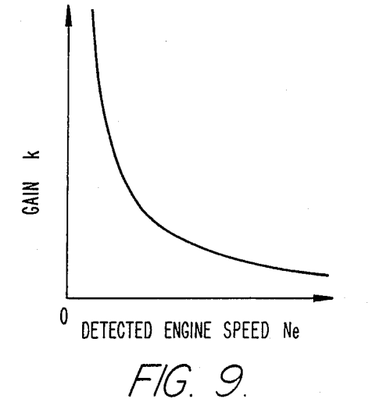
FIG. 9 is a graph showing the relationship between the engine speed and the gain of the rate of change of the transmission ratio.

FIG. 7 is a flowchart of a control sequence executed by the control diagram of FIG. 6. The amount of opening Th of the throttle valve is read in a first step S1, followed by a second step S2 in which the target engine speed Neo corresponding to the amount of throttle valve opening Th is retrieved from the map. In a step S3, the detected engine speed Ne is read. Then, the gain k for amplifying the difference (Neo−Ne) to the output voltage e is calculated according to $k = k1/Ne$ in a step S4, where k1 is a constant. Therefore, the gain k is smaller as the detected engine speed Ne is higher, and is greater as the detected engine speed Ne is lower, as shown in FIG. 9. The output or control voltage e to be supplied to the amplifier 48 is calculated according to $e = k(Neo - Ne)$ in a fifth step S5.

Operation of the first embodiment will hereinafter be described. It is understood that $1/Ne \propto k$ from the fourth step S4 of FIG. 7 or from FIG. 9, $k \propto e/(Neo - Ne)$ from the fifth step S5 of FIG. 7, $e \propto a$ from FIG. 5, $a \propto Q$ from FIG. 3, and $Q \propto di/dt$ from FIG. 4. Therefore, the rate of change di/dt of the transmission ratio i is in proportion to the reciprocal 1/Ne of the detected rotational engine speed. As a result, the gain K in the equation (1) is expressed by:

$$K = K1/Ne \quad (K1: \text{a constant})$$

Thus, $$\frac{di}{dt} = \frac{K1}{Ne} \cdot (Neo - Ne) \qquad (7)$$

From the equations (5) and (7), we get the following equation (8):

$$\frac{dNe}{dt} = \frac{K1}{i} \cdot (Neo - Ne). \quad (8)$$

Consequently, when the detected engine speed Ne is low, the gain K of the rate of change di/dt of the transmission ratio i is high, and when the detected engine speed Ne is high, the gain K of the rate of change di/dt of the transmission ratio i is low. As can be understood from the equation (8), transmission control can be obtained such that the rate of change dNe/dt of the rotational engine speed does not vary in proportion to the rotational engine speed Ne. As a result, both stability and response can be obtained in the transmission control.

Figure 10:
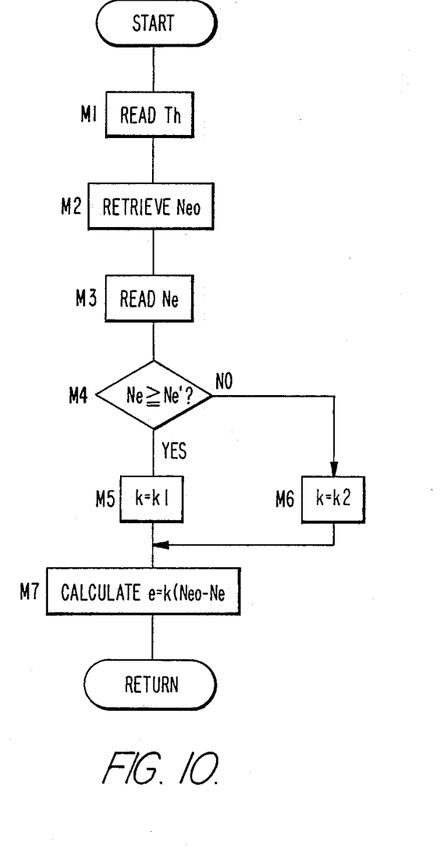
FIG. 10 is a flowchart of a control sequence according to an embodiment of the present invention.
Figure 11:
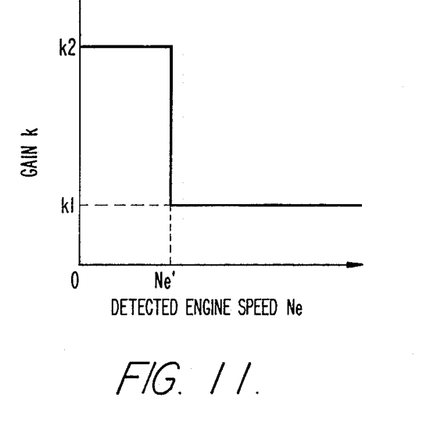
FIG. 11 is a graph showing the relationship between the engine speed and the gain of the rate of change of the transmission ratio.

FIGS. 10 and 11 illustrate a second embodiment of the present invention. FIG. 10 shows a control sequence including first through third steps m1–m3 which are the same as the first through third steps S1–S3 of FIG. 7 according to the first embodiment.

A fourth step m4 ascertains whether or not the detected engine speed Ne is equal to or higher than a preset value Ne′. The gain k is related to the engine speed Ne as shown in FIG. 11. If Ne≧Ne′, then k is equalized to k1 in a fifth step m5. If Ne<Ne′, then k is equalized to k2 in a sixth step m6. k1 and k2 are of relatively small and large values, respectively. Thereafter, e=k(Neo−Ne) is calculated in a seventh step m7.

According to the second embodiment,
k ∝ e ∝ a ∝ Q ∝ di/dt, and k ∝ di/dt.
Therefore, the gain K of the rate of change di/dt is expressed by K=C1·k (C1: a constant). Thus, $$\frac{di}{dt} = C1 \cdot k \cdot (Neo - Ne) \quad (9)$$

From the equations (5) and (9), we get $$\frac{dNe}{dt} = C1 \cdot k \cdot \frac{Ne}{i} \cdot (Neo - Ne) \quad (10)$$

When the engine speed Ne is equal to or higher than the preset value Ne′, the gain k is equalized to the relatively small k1. Therefore, the gain (K=C1·k) in the equation (9) is of a small value, preventing dNe/dt in the equation (10) from becoming excessively large. When Ne<Ne′, the gain k is equalized to the relatively large k2, thus preventing dNe/dt in the equation (10) from becoming excessively small.

In each of the first and second embodiments, the hydraulic cylinder assembly 19 may be replaced with an electric actuator such as a step motor, a linear step motor, a DC motor, an AC motor, or the like, dependent on the arrangement of the control circuit 40. Instead of employing the electric control signal, hydraulic and mechanical arrangements may be utilized to control the transmission, as described below.

Figure 12:
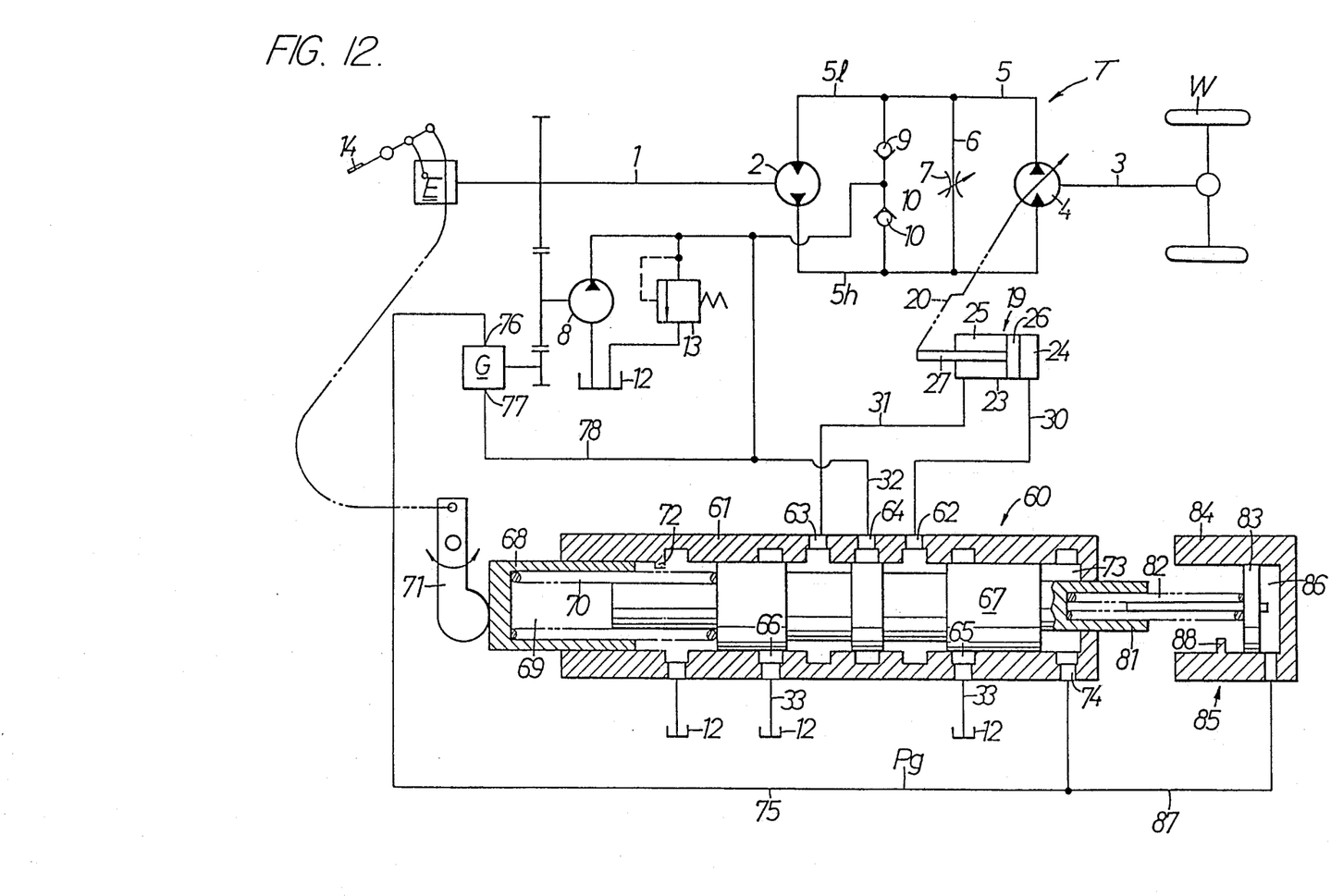
FIG. 12 is a circuit diagram, partly in cross section, of an arrangement for carrying out a method of controlling a continuously variable transmission according to a third embodiment of the present invention.
Figure 13A:
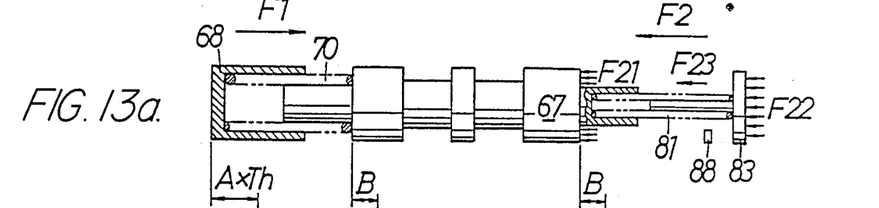
FIGS. 13(a) and 13(b) are views illustrative of the manner in which a control valve operates.
Figure 13B:
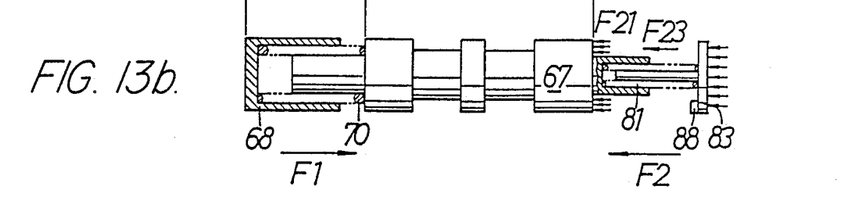

FIGS. 12 and 13 show a third embodiment of the present invention.

A control valve 60 is connected between the oil passages 30, 31 communicating respectively with the head and rod chambers 24, 25 of the hydraulic cylinder 19, and the oil supply passage 32 communicating with the supply pump 8 and the oil release passage 33 communicating with the oil tank 12. The control valve 60 includes a cylinder 61 having ports 62, 63 communicating with the oil passages 30, 31, a port 64 communicating with the oil supply passage 32, and ports 65, 66 communicating with the oil tank 12 via the oil release passage 33, and a spool 67 movably fitted in the cylinder 61 for selectively establishing and shutting off fluid communication between these ports 62–66. The spool 67 as it moves has an intermediate position in which the degree of restriction is continuously variable.

When the spool 67 is in its neutral position as shown, the ports 62 through 66 are held out of communication with each other. When the spool 67 is moved to the right, the ports 64, 63 are brought into mutual communication and so are the ports 62, 65. When the spool 67 is moved to the left, the ports 63, 66 are brought into mutual communication and so are the ports 62, 64.

A bottomed cylindrical receiver member 68 is slidably fitted in the lefthand end of the cylinder 61. Between the lefthand end of the spool 67 and the receiver member 68, there is defined a spring chamber 69 communicating with the oil tank 12 and accommodating a coil spring 70 acting between the spool 67 and the bottom of the receiver member 68. A presser 71 is held against the outer end surface of the receiver member 68 for pushing the receiver member 68 into the cylinder 61 as the accelerator pedal 14 is depressed, i.e., as the amount of throttle opening Th is increased. The spring 70 imposes a spring force F1 (FIGS. 13(a) and 13(b)) on the lefthand end of the spool 67, tending to move the spool 67 to the right, the force F1 being variably dependent on the position of the receiver member 68. The cylinder 61 has a stopper 72 projecting inwardly from its inner peripheral surface for limiting movement of the receiver member 68 into the cylinder 61.

A hydraulic pressure chamber 73 is defined between the righthand end of the spool 67 and the righthand end of the cylinder 61. The cylinder 61 has a port 74 communicating with the hydraulic pressure chamber 73 and connected through a pilot oil passage 75 to an output port 76 of a hydraulic governor G.

The hydraulic governor G is operable in response to rotation of the input shaft 1 and has an input port 77 coupled to an oil passage 78 communicating with the supply pump 8. The output port 76 of the hydraulic governor G produces a hydraulic governor pressure Pg proportional to the rotational speed of the engine E, the governor pressure Pg being supplied to the hydraulic pressure chamber 73.

A coupling rod 81 coaxially projects from the righthand end of the spool 67 and extends hermetically and axially movably through the righthand end wall of the cylinder 61. A hydraulic cylinder assembly 85 is disposed in coaxial relation to the control valve 60. The hydraulic cylinder assembly 85 includes a piston 83 slidably fitted in a cylinder 84, there being a coil spring 82 interposed between the piston 83 and the coupling rod 81. The piston 83 and the cylinder 84 define therebetween a hydraulic pressure chamber 86 communicating with the pilot oil passage 75 through a pilot oil passage 87. A stopper 88 projects inwardly from the inner peripheral surface of the cylinder 84 for limiting movement of the piston 83 in a direction out of the cylinder 84.

With the above arrangement, a force F2 (FIGS. 13(a) and 13(b)) proportional to the engine speed Ne and tending to move the spool 67 to the left acts on the righthand end of the spool 67, while the force F1 proportional to the amount of throttle opening Th and tending to move the spool 67 to the right is imposed on the lefthand end of the spool 67.

The relationship between the forces F1, F2 will be described further also with reference to FIGS. 13(a) and 13(b). It is assumed here that the receiver member 68 is moved an interval (A×Th) dependent the amount of throttle opening Th, moving the spool 67 an interval B to the right. If the piston 83 does not abut against the stopper 88 at this time, the forces F1, F2 can be expressed by:

$$F1 = (A \cdot Th - B) \cdot Ka + Fa \quad (11)$$

$$F2 = F21 + F22 \quad (12)$$

where Ka is the spring constant of the spring 70 and Fa is the set load of the spring 70. Assuming that the right-hand end of the spool 67 has an area H1 facing the hydraulic pressure chamber 73 and the piston 83 has an area H2 facing the hydraulic pressure chamber 86, $$F21 = H1 \cdot Pg \quad (13)$$

$$F22 = H2 \cdot Pg \quad (14)$$

di/dt can be given by the following equation (15):

$$\frac{di}{dt} = \alpha \cdot (F1 - F2) \quad (15)$$

where $\alpha > 0$. By putting the equations (11) through (14) in the equation (15):

$$\frac{di}{dt} = \alpha \cdot (H1 + H2) \cdot \left[ \frac{A \cdot Ka \cdot Th + Fa - BKa}{H1 + H2} - Pg \right] \quad (16)$$

If $Pg = \beta Ne$, then the equation (16) can be rewritten as the following equation (17):

$$\frac{di}{dt} = \alpha \cdot \beta(H1 + H2) \cdot \left[ \frac{A \cdot Ka \cdot Th + Fa - BKa}{\beta \cdot (H1 + H2)} - Ne \right] \quad (17)$$

where $\beta$ is a positive coefficient determined by the characteristics of the governor G. The target engine speed Neo is expressed as follows:

$$Neo = \frac{A \cdot Ka \cdot Th + Fa - BKa}{\beta \cdot (H1 + H2)} \quad (18)$$

Accordingly, the equation (17) can be rewritten as the following equation (18):

$$\frac{di}{dt} = \alpha \cdot \beta \cdot (H1 + H2) \cdot (Neo - Ne) \quad (19)$$

From the equation (19), the gain K of di/dt is expressed by:

$$K = \alpha \cdot \beta \cdot (H1 + H2) \quad (20)$$

After the piston 83 is engaged by the stopper 88 and limited in its movement thereby, the force F1 tending to move the spool 67 is expressed by the equation (11), whereas the force F2 tending to move the spool 67 to the left is given by:

$$F2 = F21 + F23 \quad (21)$$

F21 is given by the equation (13), and F23 is expressed by the following equation (22):

$$F23 = B \cdot Kb + Fb \quad (22)$$

where Fb is the set load of the spring 82 when the spool 67 is in the neutral position with the piston 83 engaged by the stopper 88. By putting the equations (13) and (22) in the equation (15) and rewriting the equation in the same manner as the equations (11) through (20), the following equations (23), (24), and (25) can be established:

$$\frac{di}{dt} = \alpha \cdot \beta \cdot H2 \cdot (Neo - Ne) \quad (23)$$

$$Neo = \frac{A \cdot Ka \cdot Th + Fa - Fb - b(Ka + Kb)}{\beta \cdot H2} \quad (24)$$

$$K = \alpha \cdot \beta \cdot H2 \quad (25)$$

On the assumption that the rotational engine speed at the instant the piston 83 engages the stopper 88 is indicated by a preset value Ne', when the engine speed Ne is lower than Ne' (Ne<Ne'), the gain K is expressed as $K = \alpha \cdot \beta \cdot (H1 + H2)$ from the equation (20), and when the engine speed Ne is equal to or higher than Ne' (Ne≧Ne'), $K = \alpha \cdot \beta \cdot H2$ from the equation (25). Since $\alpha$, $\beta$, H1, and H2 are positive numbers, it apparent that $$\alpha \cdot \beta \cdot (H1 + H2) > \alpha \cdot \beta \cdot H2$$

Consequently, when the engine speed Ne is low, i.e., lower than Ne', dNe/dt is not excessively reduced, and when the engine speed Ne is high, i.e., equal to or larger than Ne', dNe/dt is not excessively increased. As with the second embodiment, both stability and response are achieved in the transmission control. The control valve 60 is of a conventional nature, and hence the aforesaid control mode can readily be accomplished simply by adding the hydraulic cylinder assembly 85 to the control valve 60.

Figure 14:
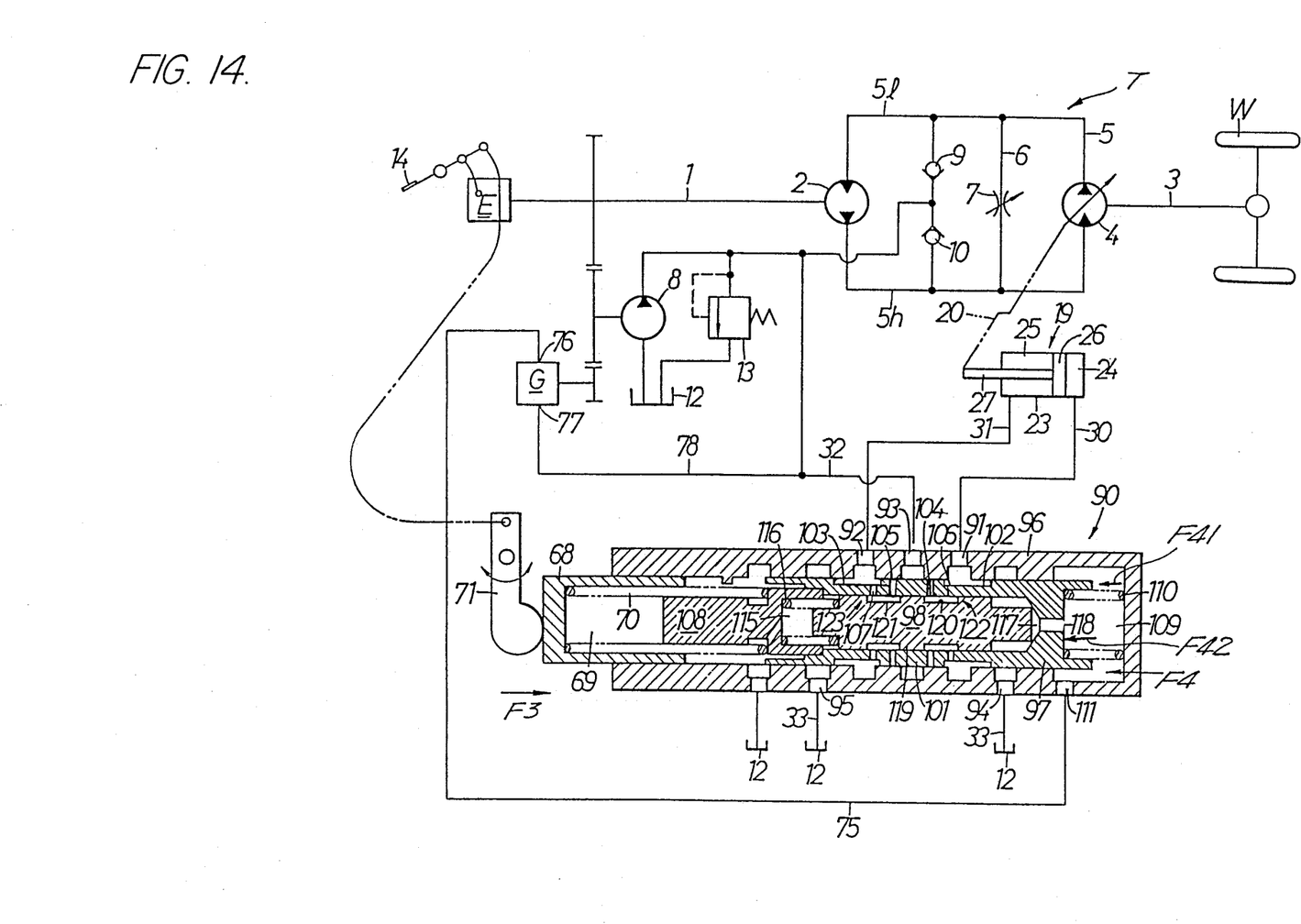
FIG. 14 is a circuit diagram, partly in cross section, of an arrangement for effecting a method of controlling a continuously variable transmission according to a fourth embodiment of the present invention.

FIG. 14 shows a fourth embodiment of the present invention.

A control valve 90 is connected between the oil passages 30, 31 communicating respectively with the head and rod chambers 24, 25 of the hydraulic cylinder 19, and the oil supply passage 32 communicating with the supply pump 8 and the oil release passage 33 communicating with the oil tank 12. The control valve 90 includes a cylinder 96 having ports 91, 92 communicating with the oil passages 30, 31, a port 93 communicating with the oil supply passage 32, and ports 94, 95 communicating with the oil tank 12 via the oil release passage 33, a first spool 97 movably fitted in the cylinder 61, and a second spool 98 slidably fitted in the first spool 97.

The first spool 97 is basically in the form of a bottomed hollow cylinder having two annular grooves 102, 103 defined in its outer peripheral surface substantially centrally in the axial direction, with an annular land 101 disposed axially between the annular grooves 102, 103. The land 101 is positioned substantially radially inwardly of the port 93, and the annular grooves 102, 103 are positioned substantially radially inwardly of the ports 91, 92, respectively. The land 101 has a pair of axially spaced oil passages 104, 105 defined radially therethrough and capable of communication with the port 93. The first spool 97 also includes an oil passage 106 opening into the annular groove 102 and an oil passage 107 opening into the annular groove 103, the oil passages 106, 107 opening into the interior space of the first spool 67.

A closure member 108 is fitted in the open end of the first spool 97. The coil spring 70 is housed in the spring chamber 69 defined in the cylinder 96 between the closure member 108 and the receiver member 68 slidably fitted in the lefthand end of the cylinder 96. The presser 71 movable dependent on the depth to which the accelerator pedal 14 is depressed is held against the outer end surface of the presser 68. The righthand end of the cylinder 96 and the closed end of the first spool 97 define therebetween a hydraulic pressure chamber 109 accommodating therein a coil spring 110. The spring chamber 69 is vented to atmosphere, and the hydraulic pressure chamber 109 is connected to the output port 76 of the hydraulic governor G through a port 111 defined in the cylinder 96 and the pilot oil passage 75.

A control force F3 proportional to the amount of throttle opening Th is applied to the lefthand end of the first spool 97, and a control force F4 proportional to the engine speed Ne is imposed on the righthand end of the first spool 97. The control force F3 is produced by the spring load of the spring 70. When the amount of throttle opening Th is increased, the presser 71 moves the first spool 97 to the right to increase the control force F3. Conversely, when the amount of throttle opening Th is reduced, the presser 71 allows the first spool 97 to move to the left, reducing the control force F3. The control force F4 is expressed by F4=F41+F42 where F41 is the spring load of the spring 110 and F42 is the hydraulic pressure equal to the product of the area of the righthand end of the first spool 97 and the hydraulic pressure Pg discharged by the hydraulic governor G.

If F3=F4, then the ports 91, 92, 93 are held out of communication with each other, and the piston 26 of the hydraulic cylinder assembly 19 is held at rest. The displacement of the hydraulic motor 4 is fixed, and so is the transmission ratio i. If F3<F4, then the first spool 97 is moved to the left to bring the ports 91, 93 into mutual fluid communication and also bring the ports 92, 95 into mutual fluid communication. Therefore, the piston 26 of the hydraulic cylinder assembly 19 is moved leftwardly thereby to reduce the displacement of the hydraulic motor 4 and hence lower the transmission ratio i. If F3>F4, then the first spool 97 is moved to the right to bring the ports 92, 93 into mutual fluid communication and also bring the ports 91, 94 into mutual fluid communication. Therefore, the piston 26 of the hydraulic cylinder assembly 19 is moved rightwardly thereby to increase the displacement of the hydraulic motor 4 and hence increase the transmission ratio i.

A spring chamber 115 is defined in the first spool 97 between the lefthand end of the second spool 98 and the closure member 108, the spring chamber 115 communicating with the spring chamber 69. The spring chamber 115 houses therein a coil spring 116 for normally urging the second spool 98 to move to the right. A hydraulic pressure chamber 117 is defined between the righthand end of the first spool 97 and the righthand end of the second spool 98. The hydraulic pressure chamber 117 is held in communication with the hydraulic pressure chamber 109 through a passage 118 defined axially in the righthand end of the first spool 97.

The spring load of the spring 116 is applied to the lefthand end of the second spool 98, and a hydraulic force due to the hydraulic pressure Pg in the hydraulic pressure chamber 117 is applied leftwardly to the righthand end of the second spool 68.

The second spool 98 has a pair of axially spaced annular grooves 120, 121 defined in its outer peripheral surface with an annular land 119 between the grooves 120, 121. The inner ends of the oil passages 104, 106 for interconnecting the ports 93, 91 and the inner ends of the oil passages 105, 107 for interconnecting the ports 93, 92 can be restricted by the second spool 98 as the annular grooves 120, 121 are moved relatively to these inner ends of the oil passages. More specifically, the oil passages 104, 106; 105, 107 and the annular grooves 120, 121 jointly constitute variable restriction mechanisms 122, 123, respectively, for continuously or steplessly adjusting the amount of restricted opening between the oil passages 104, 106 and the oil passages 105, 107. Since the position of the second spool 98 with respect to the first spool 97 is determined by the engine speed Ne, the amount of the working oil supplied to and discharged from the hydraulic cylinder assembly 19 can be continuously adjusted by the variable restriction mechanisms 122, 123 dependent on the engine speed N3.

The relationship between the opening of the variable restriction mechanisms 122, 123, the amount Q of the working oil, and the rate of change di/dt of the transmission ratio i when F3=F4 is shown in the following table 2:

TABLE 2

|  | Engine speed (Ne) | | |
| --- | --- | --- | --- |
|  | Low | Medium | High |
| Variable restriction mechanisms | Fully open | Fully open | Fully closed |
| Amount (Q) of working oil | Large | Medium | Small |
| di/dt | Large | Medium | Small |

As a result, when the engine speed Ne is low, the gain of di/dt can be increased, and when the engine speed Ne is high, the gain of di/dt can be reduced, in the same manner as with the first embodiment.

While the variable restriction mechanisms 122, 123 are provided in passageways for supplying the working oil to the hydraulic cylinder assembly 19, such variable restriction mechanisms may instead be disposed in passages for relieving the working oil from the rod chamber 24 and the head chamber 25 of the hydraulic cylinder assembly 19 to the oil tank 12.

In the arrangement of FIG. 14, the spring constant of the spring 116 may be reduced, so that when the force tending to move the second spool 98 is increased by an increase in the engine speed Ne, the second spool 98 may immediately be moved to the left to fully open the restricted opening between the oil passages 104, 106 and the oil passages 105, 107 right away. With this alternative, substantially no intermediate opening position is available between the fully open position and the fully closed position for the second spool 98. The operation may then be substantially the same as that of the first embodiment.

The present invention is not limited to the hydraulically operated, continuously variable automotive transmission, but may be applied to any of various other continuously variable transmissions such as of a belt drive or toroidal traction drive type.

The present invention is not limited to the hydraulically operated, continuously variable automotive transmission comprising the fixed-displacement hydraulic pump 2 and the variable-displacement hydraulic motor. The principles of the present invention are applicable to a transmission comprising a variable-displacement hydraulic pump and a fixed-displacement hydraulic motor, or a transmission comprising a variable-displacement hydraulic pump and a variable-displacement hydraulic motor.

While the discharged hydraulic pressure from the supply pump 8 is employed in the above embodiments as the working pressure on the hydraulic cylinder assembly 19, a higher hydraulic pressure in the closed hydraulic circuit 5 may be utilized as the working pressure for producing a larger working force.

The detection of the throttle valve opening or the accelerator pedal depression as an indication of the driver's intention of acceleration and deceleration may be replaced with the detection of the vacuum developed in the intake pipe of the engine, and the amount of fuel supplied. Instead of directly detecting the engine speed Ne, the engine speed may be calculated from the automobile speed or the output rotational speed and the transmission ratio.

With the present invention, as described above, the gain of the rate of change of the transmission ratio is reduced as the detected engine speed is increased. The rate of change of the engine speed remains the same irrespective of whether the engine speed is high or low. Accordingly, both stability and response can be achieved in the control of the transmission.

Although certain preferred embodiments have been shown and described, it should be understood that many changes and modifications may be made therein without departing from the scope of the appended claims.

What is claimed is:

1. A method of controlling a continuously variable transmission having a variable transmission ratio in an automobile having an engine by controlling the transmission ratio thereof based on the difference between a target rotational speed of the engine which is preset according to an indication of the driver's intention of acceleration or deceleration and a detected rotational speed of the engine, said method comprising the step of:
reducing a variable gain of the time rate of change of the transmission ratio as the detected rotational speed of the engine increases.

2. A method according to claim 1, wherein the gain of the dime rate of change of the transmission ratio is increased as the detected rotational speed of the engine decreases.

3. A method according to claim 1, wherein the gain of the dime rate of change of the transmission ratio is of a relatively small value when the detected rotational speed of the engine is equal to or higher than a preset speed, and the gain of the dime rate of change of the transmission ratio is of a relatively large value when the detected rotational speed of the engine is lower than said preset speed.

4. A method according to claim 3, wherein said gain of the time rate of change of the transmission ratio varies between two predetermined values.

5. A method of controlling a continuously variable transmission having a variable transmission ratio in a vehicle having an engine by controlling the transmission ratio thereof based on the difference between a target rotational speed of the engine which is preset according to an indication of the driver's intention of acceleration or deceleration and a detected rotational speed of the engine, said method comprising the step of:
varying a variable gain of the time rate of change of the transmission ratio according to the detected rotational speed of the engine in such a manner that said gain is reduced when said detected rotational speed of the engine increases and said gain is increased when said detected rotational speed of said engine decreases.

6. A method according to claim 5, further comprising the step of comparing said detected rotational engine speed to a preset value and adjusting said gain according to the difference between said detected rotational engine speed and said preset value.

7. A method according to claim 6, wherein said gain is set to a first predetermined value when said detected rotational speed of the engine is below said preset value and said gain is set to a second predetermined value when said detected rotational speed of the engine is above said preset value.

8. A control system for a continuously variable transmission having a hydraulic pump with an input shaft driven by an engine and a variable hydraulic motor with an output shaft, the pump and motor being hydraulically connected, a hydraulic actuator operably connected to the variable hydraulic motor for causing variable operation of the hydraulic motor to vary the transmission speed ratio between the input shaft and output shaft, comprising, a valve with a cylinder body having port means connected to the hydraulic actuator for supplying oil thereto, a hydraulic oil pressure source connected to said cylinder body, spool means slidably mounted in said cylinder body and having means for selectively controlling the flow of oil from said source to said port means for operating the hydraulic actuator, means for applying a force on said spool means in one direction in relation to engine speed and means for applying a force on said spool means in an opposite direction in relation to a selected engine speed indicated by an engine accelerator control means position for controlling operation of the hydraulic actuator and in turn the transmission speed ratio of the continuously variable transmission, wherein said spool means includes a first spool with a bore therein and a second spool in said bore, and wherein said means for applying a force in one direction applies such force to at least said second spool and said means for applying a force in an opposite direction applies such force to only said first spool.

9. A control system for a continuously variable transmission having a hydraulic pump with an input shaft driven by an engine and a variable hydraulic motor with an output shaft, the pump and motor being hydraulically connected, a hydraulic actuator operably connected to the variable hydraulic motor for causing variable operation of the hydraulic motor to vary the transmission speed ratio between the input shaft and output shaft, comprising, a valve with a cylinder body having port means connected to the hydraulic actuator for supplying oil thereto, a hydraulic oil pressure source connected to said cylinder body, spool means slidably mounted in said cylinder body and having means for selectively controlling the flow of oil from said source to said port means for operating the hydraulic actuator, means for applying a force on said spool means in one direction in relation to engine speed and means for applying a force on said spool means in an opposite direction in relation to a selected engine speed indicated by an engine accelerator control means position for controlling operation of the hydraulic actuator and in turn the transmission speed ratio of the continuously variable transmission, wherein said spool means includes a first spool with a bore therein and a second spool in said bore, wherein said means for applying a force in one direction applies such force to at least said second spool and said means for applying a force in an opposite direction applies such force to only said first spool, and wherein said first spool and second spool have cooperating oil passages for controlling the rate of oil flow to said port means upon relative movement between said first and second spools.

10. A control system for a continuously variable transmission having a hydraulic pump with an input shaft driven by an engine and a variable hydraulic motor with an output shaft, the pump and motor being hydraulically connected, a hydraulic actuator operably connected to the variable hydraulic motor for causing variable operation of the hydraulic motor to vary the transmission speed ratio between the input shaft and output shaft, comprising, a valve with a cylinder body having port means connected to the hydraulic actuator for supplying oil thereto, a hydraulic oil pressure source connected to said cylinder body, a first spool slidably mounted in said cylinder body and having a bore therein, a second spool slidably mounted in the bore of said first spool, cooperating oil passage means on said first and second spools for selectively controlling the flow of oil from said source to said port means for operating the hydraulic actuator, means for supplying a hydraulic oil pressure related to engine speed to said first spool bore for causing movement of said second spool relative to said first spool for controlling the rate of oil flow through said cooperating oil passages, and means for causing movement of said first spool relative to said cylinder body to selectively control the supply oil through said port means to the hydraulic actuator in response to a difference in actual engine speed and a selected engine speed indicated by an engine accelerator control means position for controlling operation of the hydraulic actuator and in turn the transmission speed ratio of the continuously variable transmission.

11. The control system of claim 10, wherein means are provided for applying a second force on said first spool in a manner to directly oppose said force applied in an opposite direction, which second force is related to the engine speed, for causing termination of oil flow to the port means when actual engine speed equals the desired engine speed.

12. A method for controlling a continuously variable transmission having a variable transmission ratio in a vehicle having an engine by controlling the transmission ratio thereof based on the difference between a target rotational speed of the engine which is preset according to an indication of the driver's intention of acceleration or deceleration and a detected rotational speed of the engine, said method comprising the step of:
varying a variable gain of the time rate of change of the transmission ratio according to the detected rotational speed of the engine in such a manner that said gain varies inversely proportionally to said detected rotational speed of the engine.

13. A method of controlling a continuously variable transmission having a variable transmission ratio in a vehicle having an engine by controlling the transmission ratio thereof based on the difference between a target rotational speed of the engine which is preset according to an indication of the driver's intention of acceleration or deceleration and a detected rotational speed of the engine, said method comprising the steps of:
comparing said detected rotational speed to a preset value, and
varying a variable gain of the time rate of change of said transmission ratio between two discrete values according to whether said detected rotational speed is less than said preset value by setting said variable gain to a first relatively high value when said detected rotational speed is less than said preset value and a second relatively low value when said detected rotational speed is greater than or equal to said preset value.

* * * * *

UNITED STATES PATENT AND TRADEMARK OFFICE
CERTIFICATE OF CORRECTION

PATENT NO. : 4,949,596

DATED : August 21, 1990

INVENTOR(S) : T. Iino et al.

It is certified that error appears in the above-identified patent and that said Letters Patent is hereby corrected as shown below:

Column 13, claim 2, line 49, change "dime" to -- time --.

Column 13, claim 3, line 53, change "dime" to -- time --.

Column 13, claim 3, line 56, change "dime" to -- time --.

Signed and Sealed this

Eighteenth Day of January, 1994

Attest:

BRUCE LEHMAN

*Attesting Officer*          *Commissioner of Patents and Trademarks*